United States Patent
Schultz Van Endert et al.

(10) Patent No.: US 7,115,701 B2
(45) Date of Patent: Oct. 3, 2006

(54) METHOD FOR THE CONTINUOUS PRODUCTION OF HIGH-MOLECULAR POLYESTER AND DEVICE FOR CARRYING OUT THE METHOD

(75) Inventors: Eike Schultz Van Endert, Berlin (DE); Rainer Hagen, Berlin (DE); Thomas Hille, Berlin (DE); Christian Atlas, Berlin (DE); Ulrich Thiele, Bruchköbel (DE)

(73) Assignee: Inventa-Fischer GmbH & Co. KG, Berlin (DE)

( * ) Notice: Subject to any disclaimer, the term of this patent is extended or adjusted under 35 U.S.C. 154(b) by 126 days.

(21) Appl. No.: 10/495,197

(22) PCT Filed: Nov. 11, 2002

(86) PCT No.: PCT/EP02/12564

§ 371 (c)(1),
(2), (4) Date: Jun. 16, 2004

(87) PCT Pub. No.: WO03/042278

PCT Pub. Date: May 22, 2003

(65) Prior Publication Data

US 2005/0163679 A1 Jul. 28, 2005

(30) Foreign Application Priority Data

Nov. 12, 2001 (DE) .................. 101 55 419

(51) Int. Cl.
 *C08G 63/00* (2006.01)
(52) U.S. Cl. .................. 528/271; 264/176.1; 264/219; 422/131; 528/272
(58) Field of Classification Search ............. 264/176.1, 264/219; 422/131; 528/193, 194, 271, 272
See application file for complete search history.

(56) References Cited

U.S. PATENT DOCUMENTS

| | | | |
|---|---|---|---|
| 2,727,882 A | 12/1955 | Vodonik | |
| 3,329,401 A | 7/1967 | Rothert et al. | |
| 3,644,096 A | 2/1972 | Lewis et al. | |
| 3,676,485 A | 7/1972 | Lewis et al. | |
| 4,110,316 A | 8/1978 | Edging et al. | |
| 4,289,895 A | 9/1981 | Burkhardt et al. | |
| 4,382,139 A | 5/1983 | Kapteina et al. | |
| 4,670,580 A | 6/1987 | Maurer | |
| 4,680,376 A | 7/1987 | Heinze et al. | |
| 5,372,790 A | 12/1994 | Shirtum et al. | |
| 5,779,986 A | 7/1998 | Van Endert et al. | |

FOREIGN PATENT DOCUMENTS

| | | |
|---|---|---|
| DE | 35 44551 A1 | 6/1987 |
| EP | 0 719 582 B1 | 7/1996 |
| FR | 1545487 | 11/1968 |
| GB | 832088 | 4/1960 |

OTHER PUBLICATIONS

Otto, Brigitta Dr., Streng, Michael; "PET—neue Entwicklungen und neue Markte", KunststoffForshung, May 2001, pp. 24-25 *and English Translation*.

Vauck, Wilhelm R. A., Mueller, Heimann A., "CIP Kurztitelaufnahme der Deutschen Bibliothek", Grundoperationen chemischer Verfahrenstechnik, Rev. Ed. Weinheim; New York, NY, 1988 *and English Translation*.

*Primary Examiner*—Terressa Boykin
(74) *Attorney, Agent, or Firm*—Barnes & Thornburg LLP

(57) ABSTRACT

The invention relates to a method for producing high-molecular polyester such as polyethylene terephthalate (PET), polybutylene terephthalate (PBT), polynaphthalene terephthalate (PEN), polytrimethylene terephthalate (PTT) and/or polyester of other dicarboxylic acids and diols, including the copolymers of the same. The invention also relates to a device for carrying out said method, the device being a single-stage tower reactor by which means a method involving only two reactors is carried out for the entire process.

37 Claims, 2 Drawing Sheets

Figure 1:
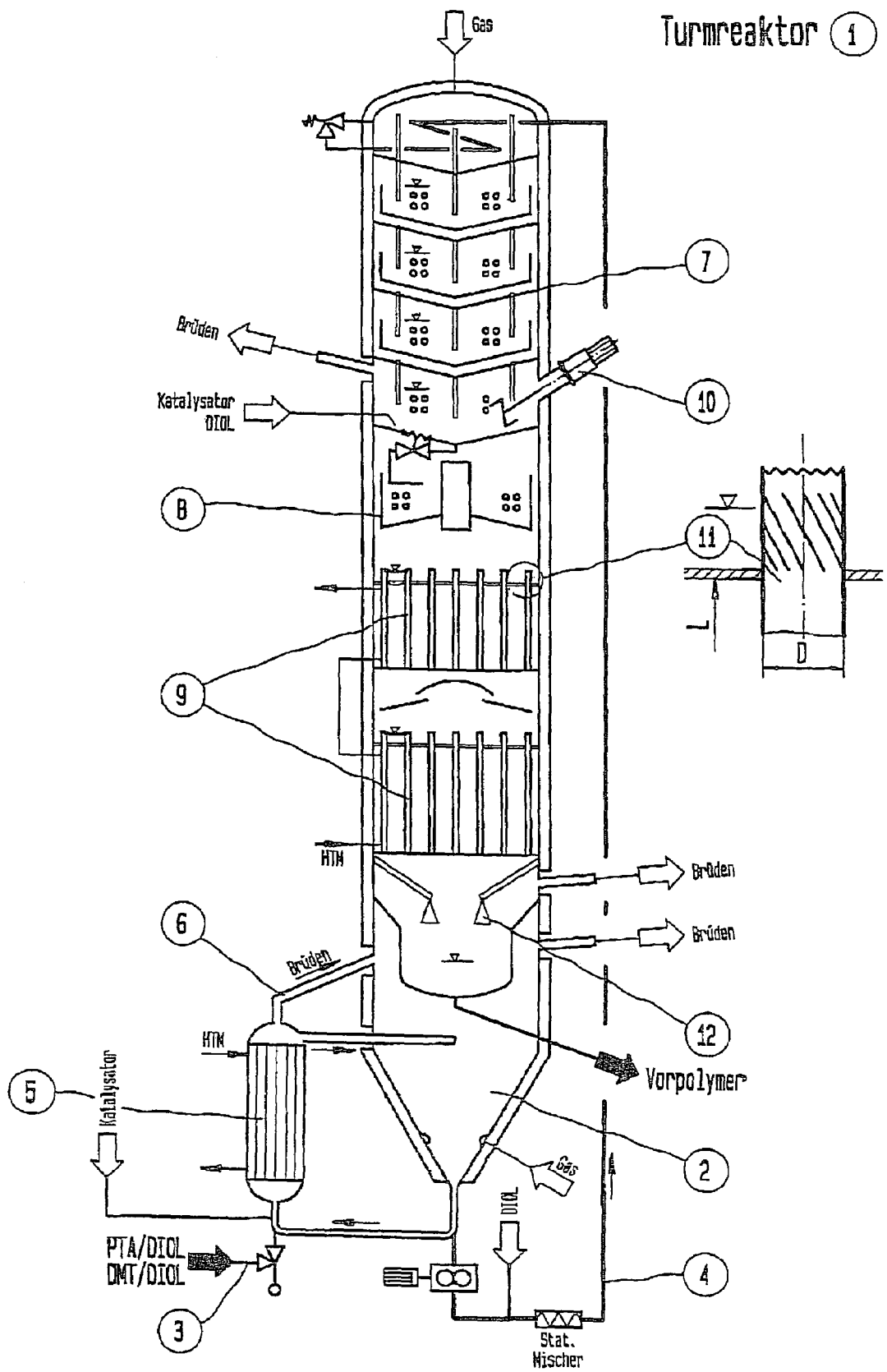

METHOD FOR THE CONTINUOUS PRODUCTION OF HIGH-MOLECULAR POLYESTER AND DEVICE FOR CARRYING OUT THE METHOD

CROSS-REFERENCE TO RELATED APPLICATIONS

This application is a U.S. national counterpart application of international application serial no. PCT/EP02/12564 filed Nov. 11, 2002, which claims priority to German application serial no. 101 55 419.2 filed Nov. 12, 2001.

BACKGROUND AND SUMMARY OF THE INVENTION

The invention relates to a method for producing high-molecular weight polyesters, such as e.g. polyethylene terephthalate (PET), polybutylene terephthalate (PBT), polynaphthalene terephthalate (PEN), polytrimethylene terephthalate (PTT) and/or polyesters of other dicarboxylic acids and diols including copolymers thereof. The invention likewise relates to a device for implementation of this method. This concerns a single-stage tower reactor with which a method, comprising only two reactors, is made available for the total process.

Methods for continuous production of polyesters are known from the state of the art, in which multiple-stage reactor systems are used which comprise three to five different reaction vessels which are connected to each other. In the case of these methods, the polyester formation is implemented in a plurality of reaction steps which are generally configured as stirred vessels, which steps proceed spatially separately from each other: esterification, transesterification, precondensation, polycondensation and polyesterification. The reaction conditions for the esterification are thereby at temperatures between 200 and 280° C. and pressures between 0 and 4 bar, whilst the conditions for the transesterification are normally at atmospheric pressures and at temperatures between 150 and 240° C., dependent upon the initial substances, especially upon the diols. Low temperatures and low pressures are desirable for the methods in order to avoid undesired secondary reactions.

A method for continuous production of high-molecular weight polybutylene terephthalate is known therefore from DE 35 44 551 A1, in which the method is implemented at atmospheric pressure.

It is important with all the methods known from the state of the art to fulfil the following conditions:

I) Suitable process control and configuration of the devices in order to avoid undesired secondary reactions.
II) As rapid as possible removal of the byproducts, such as e.g. water, methanol, THF and acetaldehyde, as a result of which the reaction equilibrium is moved to the right and the main reaction consequently proceeds with precedence.
III) Sparing treatment, i.e. short dwell time with a minimum reaction temperature.
IV) Optimally coordinated pressure reduction and/or respectively temperature increase in order to achieve the greatest possible progress of the esterification/transesterification and also of the polycondensation/polyesterification.
V) High surface formation for improving the reaction kinetics.

These objects can be fulfilled only unsatisfactorily by means of a plurality of successively connected stirred vessels which are normally used according to the state of the art for these processes. Consequently, e.g. the quality of the product or the quantity of undesired byproducts and also the yield can be affected negatively, as a result of which, in addition to further disadvantages, such as energy consumption, maintenance requirements and investment costs, the economic efficiency of these methods is greatly impaired.

Starting from these disadvantages of the state of the art, it was the object of the present invention to provide a method for producing high-molecular weight polyesters using a single, integrated reactor which fulfils the requirements (I) to (V).

This object is achieved by the generic method with the characterising features of claim 1 and also by the generic device with the characterising features of claim 18. The further dependent claims reveal advantageous developments.

According to the invention, a method for continuous production of high-molecular weight polyester is provided, based on the esterification of dicarboxylic acids and/or transesterification of dicarboxylic acid esters with diols in the presence of catalysts with simultaneous formation of a prepolymer and polycondensation thereof into high-molecular weight polyester. The following steps thereby characterise the course of the method:

a1) A paste and/or a suspension of the dicarboxylic acids and of the diol is produced, a molar ratio of diol to dicarboxylic acid of 0.8 to 1.8 being maintained. At the same time, the temperature is maintained between 20 and 90° C. and the pressure between 0.1 and 1 bar.

a2) Alternatively to a1), a dicarboxylic acid ester can be melted and mixed with the diol in a molar ratio of diol to dicarboxylic acid ester of 1.2 to 1.8 at a temperature of 145 to 165° C.

b) The products from a1) and/or a2) are supplied continuously to a tower reactor. In the tower reactor, the esterification or respectively transesterification is then effected continuously, simultaneously and without interruption until precondensation, the following reaction conditions being maintained:

b1) The products from a1) and/or a2) are subjected to a temperature treatment at 170 to 270° C. and pressures of 0.3 to 3 bar without mechanical stirring. At the same time, a partial quantity of the catalyst and/or catalysts is supplied, whilst the reaction vapours are removed in situ from the reaction mixture.

b2) The product obtained from b1) is transferred continuously into a pipe stretch and the pressure is thereby maintained between 1 and 10 bar, the temperature between 200 and 280° C. In this reaction step, at the same time 0.03 to 0.3 mol diol are supplied.

b3) The product from b2) is transferred continuously into a third zone, a reduced pressure of 0.1 to 2 bar and a temperature between 230 and 280° C. being maintained 0.02 to 0.2 mol diol and a partial quantity of the catalyst and/or catalysts are supplied in this third step.

b4) The product from b3) is subjected to further reaction, the pressure being maintained between 0.01 and 0.1 bar and the temperature between 240 to 280° C.

b5) The reaction product water from the esterification or respectively methanol from the transesterification, the byproducts and also excess diol from the reaction steps b1) and b3) to b5) are removed and the diol is supplied back to the individual process steps after removal of low boilers.

c1) The prepolymer obtained from b4) is further processed in a normal polycondensation apparatus at temperatures between 240 and 290° C. and at pressures between 0.0002 to 0.003 bar continuously to obtain a polymer.

c2) Alternatively to c1) it is also possible to solidify the obtained prepolymer, to process it into pellets and to subject it to subsequent polycondensation in solid phase at temperatures between 160 and 230° C. under inert gas.

The new method allows the parallel, uninterrupted sequence of transesterification/esterification and precondensation of dicarboxylic acids and esters thereof with diols in a single tower reactor. As a result, the mechanical and process-technological integration of a plurality of process steps is made possible for the first time for the polyester synthesis. Preferably, the gaseous byproducts produced in step b1) and the excess diol are separated by means of a hydrocyclone in "statu nascendi" from the reaction mass. In addition, an inert gas and/or a process gas can be directed through the base to assist this separation. There is great significance in the rapid separation of low boiling reaction gases with respect to minimising the formation of byproducts by auto- and acid catalysis. The content of byproducts in the reaction material is determined, on the basis of the partial pressures of these products, by the occurring reaction pressure and the static product levels present: the higher is the total pressure, the higher is the formation of byproducts. The configuration as hydrocyclone with externally situated heat exchanger is therefore decisive for a short dwell time of the byproducts in the reaction material in the case of increasing static product level because of the auto-adjusting thermosiphon circulation, causing an immediate effective degassing in the hydrocyclone and in the heat exchanger.

During implementation of an esterification, preferably a temperature between 200 and 270° C. and a pressure between 0.3 and 3 bar is maintained in step b1). If in contrast a transesterification is implemented, then step b1) is implemented at a temperature between 170 and 200° C. and at a pressure between 0.3 to 1 bar.

In step b2), during implementation of an esterification, the pressure is maintained preferably between 2 and 6 bar, the dwell time between 1 and 5 min and the temperature preferably between 220 and 280° C. and particularly preferably between 230 to 250° C. If in contrast a transesterification is implemented, the pressure in step b2) is maintained preferably in the range between 2 and 5 bar, the dwell time between 1 and 4 min and the temperature in the range between 200 and 240° C., particularly preferably between 210 and 230° C.

In an advantageous development of the method, in step b3), the reaction product supplied continuously from step b2) is directed over a downflow cascade, the pressure falling by 20 to 60 mbar and the temperature increasing by 5 to 20° C. per reaction tray. During the esterification, a prepolycondensate is thereby produced with 5 to 20 repeat units with a conversion between 97 and 99.5%. During the transesterification, the conversion is however between 98.5 and 99.8%.

Preferably, in addition to the normal process gas, a dry inert gas and/or superheated process gas is directed into at least the first tray below the reaction material surfaces. As a result, the separation of the byproducts is assisted by "entrainment effect", i.e. saturation of the gases. At the same time, the internal intermixing of the reaction material is achieved. The dwell time in the individual trays is preferably in a range between 5 and 15 min.

In a further advantageous development of the method, the supply of product is effected centrally in the trays. The product thereby discharges at the outer periphery of the trays distributed uniformly over the outer wall, which serves for accelerated degassing, and subsequently is directed together again centrally.

The step b4) is configured as a falling-film zone with initial pressure reduction and is implemented preferably at a temperature between 245 and 270° C. and a dwell time between 4 and 30 min, and at a pressure between 0.01 and 0.05 bar. A prepolycondensate is thereby produced with 10 to 40 repeat units with a conversion of 99.8%.

The reaction product is directed together after leaving one or more falling-film zone(s) preferably through a heated cone, a gas-liquid separation being undertaken in its central region by means of a spoiler-shaped outlet.

Preferably, 1,2-ethanediol, 1,3-propanediol or 1,4-butanediol is used as diol. The method is also suitable for cyclohexane dimethanol. Terephthalic acid is used preferably as dicarboxylic acid. During transesterification, preferably dimethyl terephthalate (DMT) is used as dicarboxylic acid ester. There are used as catalysts preferably the known tin, antimony, germanium, manganese, calcium and/or titanium metals etc., in particular as organic compounds thereof. The catalysts can also be accommodated in a porous carrier substance in order to achieve a specific closing effect.

According to the invention, likewise a device for implementing the described method according to the invention is provided, which has at least one stirring vessel for slurry preparation, reaction zones for the simultaneous esterification or transesterification and precondensation as well as at least one polycondensation reactor for the solid and/or liquid phase. The individual reaction zones are thereby combined into one tower reactor and connected at least to one reactor for the polycondensation.

The tower reactor is thereby constructed in the following manner: in the lower portion, the tower reactor is configured in the form of a hydrocyclone with an attached heat exchanger and has a supply line for the paste, the suspension and/or the liquid raw material mixture. The hydrocyclone is connected via a pressure pipe to the top side of the tower reactor. The top side of the tower reactor is thereby configured in the form of a downflow cascade. This cascade is connected via a suitable inlet pipe to the central part of the tower reactor which is configured in the form of a single- or multiple-stage falling-film zone with initial pressure reduction.

Preferably, the hydrocyclone has a vapour connection piece and is connected in the lower part of the tower reactor to a heat exchanger. As a result, it is made possible to direct the product in a natural or enforced circulation via the heat exchanger into the hydrocyclone.

In an advantageous embodiment, the heat exchanger has a separate gas chimney which leads into an upper part of the cyclone.

Preferably, the cascade has at least two, particularly preferred four trays. A stirring assembly can thereby be integrated in at least one cascade region in order to assist the input of diol or additives.

The pressure pipe is configured preferably as a double-walled jacket pipe which continues in the interior of the first top tray as a heating coil. The pressure pipe can thereby be equipped with a volume feed pump and static mixing elements or a mixing pump.

Preferably, the hydrocyclone has an inert gas inlet with a suitable gas distributor in its conical region.

In an advantageous embodiment, one of the top trays in the vapour region likewise has an inert gas inlet. The reaction gases and/or foreign gases are preferably directed from reaction zone to reaction zone through the reaction liquid in parallel flow by means of immersed supply tubes.

Preferably, the preliminary pressure reduction zone for the falling-film zone has likewise the form of a hydrocyclone which supports the flash effect and ensures suitable separation of the liquid/gas phases.

The supply of the product from the initial pressure reduction zone to the falling-film zone is effected by suitable configuration of the discharge therefrom in the concentric outer region of the falling-film zones and the product is distributed uniformly in the pipe field via channels.

It is likewise preferred that the falling-film zone has at least one pipe field. An inlet cylinder is thereby assigned to each pipe of the pipe field, which inlet cylinder ensures a uniform wetting of the inside of the pipe, the latter being equipped with overlapping, non-axial slots on the circumference, a constant filling level above the pipe series being produced because of the slot pressure loss and having a maximum overflow with an indented crown, the slots being configured such that viscosity differences cause only negligible changes in the filling level, but in fact a proportional change of filling level to liquid throughput.

It is likewise preferred that the length of the falling-film pipes is dimensioned such that total wetting is effected.

Preferably, the diameter of the falling-film pipes is selected to be larger than the largest occurring reaction vapour bubble. The reaction vapours are thereby directed in parallel flow with the downwardly flowing product.

The falling-film pipe field can preferably be used also for heat transference.

Preferably, the entire tower reactor is equipped with a jacket for heating with organic heating media in vapour form.

In a further advantageous embodiment, all the heat exchanger surfaces are equipped in the individual zones for liquid heat carriers for process-relevant temperature and heat quantity distribution.

The subject according to the invention is intended to be explained in more detail by means of the following figures and the example, without restricting the latter to these embodiments.

FIG. 1 shows the schematic structure of a tower reactor (1). A suspension of the dicarboxylic acid with the diol or the molten dicarboxylic acid ester and the diol are injected under pressure into the reaction fluid in the lower region of a heat exchanger (5) suspended on the tower reactor, the result being, due to suitable configuration of the injection connection piece (3), an optimal intermixing with the boiling reaction product in the lower part. Also a catalyst, which is advantageous for some polyester reactions, can be fed in here. The heat exchanger ensures the heating of the mixture to the boiling temperature of the reaction. The boiling reaction mixture passes via a short connection pipe which discharges tangentially into a hydrocyclone (2) for further reaction. For rapid reaction gas discharge from the reaction material, the main part of these gases is directed via a separate pipe, a vapour chimney (6), out of the heat exchanger into the gas chamber of the cyclone.

A further degassing during continuation of the reaction takes place in the hydrocyclone (2). The reacted product passes via a short connection pipe at the foot of the cyclone back into the heat exchanger (5) so that a natural circulation is produced. The entire reaction gas is withdrawn above the reaction fluid from the vapour chamber of the hydrocyclone (2).

In the case of particularly sensitive products, such as e.g. in the production of PBT, undesired tetrahydrofurane (THF) is produced by cyclisation of butanediol. The formation is increased by the presence of water which is produced for example during esterification. Advantageously, a preheated, unsaturated entrainment gas or superheated process vapour can be introduced in this case in the lower region of the cyclone, as a result of which the removal of, in particular water, methanol, acetaldehyde or tetrahydrofuran from the reaction material is accelerated.

A partial stream of the degassed reaction product is removed from the lower connection pipe and pumped by means of a pressure-increasing volume conveyor into a heated pressure pipe (4). The pressure pipe (4) is equipped at the pump outlet with a metering pipe for diol which is mixed intimately with the reaction material via static mixing elements. According to the product, a pressure here of up to 10 bar can be set via a pressure maintaining valve. Alternatively, the intermixing and the pressure can also be produced by a special mixing pump.

By introducing the diol under pressure, a spontaneous conversion with the carboxyl- or methoxy groups is initiated, which proceeds in the time range of 1 to 5 minutes and is ended after pressure reduction to atmospheric or subatmospheric pressure. The reaction time is adjusted in that a part of the pressure pipe is designed in the form of a heating coil in the uppermost reaction zone of the tower reactor. The double-walled jacket ensures that the reaction material cooled by pressure reduction is brought again to reaction temperature.

The pressure-reduced reaction fluid is now conducted through a downflow cascade (7) which comprises at least 2 preferably 4 to 5 reaction trays fitted with heating coils, into which the product flows centrally and dipped under the surface. The reaction gas is in contrast conducted separately out of the tray situated respectively thereabove by means of likewise dipped pipes through the reaction fluid. A differential pressure, which acts preferably as a pressure reduction from tray to tray from top to bottom is produced herefrom.

The product from the second to $x^{th}$ tray flows down on the outer wall, which acts as an additional evaporation surface, to each next tray in a conically shaped collector, the discharge of which is located centrally at the deepest point of the cone. In the collector, there are also located the dip pipes which introduce the reaction gas into the next tray. The trays are preferably designed for a dwell time of 5 to 10 min in order to achieve the desired reaction progress. In order to maintain the required reaction temperature, preferably a gentle increase by 2 to 10° C. per tray, each tray is equipped with heating coils and respective controls.

It results from the arrangement that the reaction gas is directed in parallel flow with the product stream, the gas bubbling through the reaction material and, on the one hand, ensuring there an optimum intermixing, on the other hand, not achieving its saturation limit because of the pressure drop with simultaneous temperature increase and consequently remaining absorbent for newly forming reaction gas (entrainment effect). A further important effect of the described downflow cascade is that the low-boiling, short-chained oligomers of the product, which are initially still available, are directed back into the reaction fluid by the reaction gas and there take part further in the reaction. Due to the introduction of the gas into the reaction fluid, by additional surface formation and contact with the gaseous diol, the bubble formation further promotes the speed of the reaction.

This is not possible for example in the case of stirred cascades and as a result the yield is reduced and interferences are caused in the subsequent condensers and vacuum devices.

Insofar as it is required for mixing additional additives or diol, an inclined stirrer (10) can be placed in the last tray, which stirring assists intermixing due to vapour bubbles.

The reaction material is brought subsequently by a suitable supply line for renewed pressure reduction into an arrangement configured similarly to a hydrocyclone, which arrangement is equipped like the previous trays with heating coils for temperature control. The gas/liquid separation is effected on the surface, being ensured by suitable baffles that the reaction fluid discharges uniformly over the indented outer edge of the tray, unaffected by forming reaction gas bubbles. The reaction fluid discharging at the periphery is collected on a pipe base plate—likewise on the periphery thereof—and is distributed on the base plate uniformly with the assistance of so-called "channels".

The pipe base is part of a straight pipe bundle (field) (9) which serves simultaneously for film formation on the inner pipe surfaces and for heat exchange. An inlet cylinder (11) is assigned to each pipe in the bundle. Said inlet cylinder is configured with a series of non-axial, overlapping slots with a particularly designed geometry at its periphery. The geometry is established such that

- a minimum level for all pipes is maintained for uniform liquid distribution,
- only small level differences occur for a specific viscosity spectrum,
- throughput changes effect a proportional level change only and the inner pipe surface is wetted uniformly over the entire pipe length,
- the upper edge of the inlet cylinder (11) serves as an emergency overflow and is equipped with an indented crown.

The pipe diameter is chosen such that it is greater than the largest possible occurring reaction gas bubble. The reaction vapour is directed in parallel flow with the downwardly running product film. The ratio of pipe length to pipe diameter should be between 10 and 25 and the surface of the falling-film pipes must be adapted to the wettability of the product. The product emerges as a film and/or strands on the underside of the falling-film pipes, is directed together by conical collector sheets which allow the gas flow to pass through and is supplied to a second falling-film reaction zone on the periphery. The latter is in principle configured identically to the first zone but takes into account the increased viscosities by means of corresponding measures on the inlet cylinders (11), distribution of the pipes and length of the module.

Below the module, a device is located for directing together the melt which contains in the centre a central pipe for the guidance of the reaction gases and the product. The product discharging on the device, preferably on the wall, is separated from the gas flow by a spoiler device (12), which gas flow is deflected and discharged into the gas chamber of the integrated prepolymer collector. The collected prepolymer is removed from the collector after a resting and secondary reaction time of 5 to 15 minutes via a central pipe and can now be subjected to a further treatment, e.g. granulation with subsequent solid phase or a melt phase high (post)condensation. For specific products, the possibility is provided of directing back a partial flow of the prepolymer into the lower falling-film module and of mixing it with the preproduct from the upper falling-film module so that the reaction time can be advantageously increased in a simple manner. As such, extended chain lengths can be obtained.

The outer covering of the reactor is a heating jacket which is provided preferably with a synthetic heat transfer vapour as active insulation for the heating. The temperature profile required for the reaction is produced essentially with a heat transfer oil in zones by means of the inner heating faces. The reaction gases from the different zones are discharged by normal devices, such as condensers, columns and vacuum systems, the diol being essentially directed back with small proportions of oligomer into the process.

Figure 2:
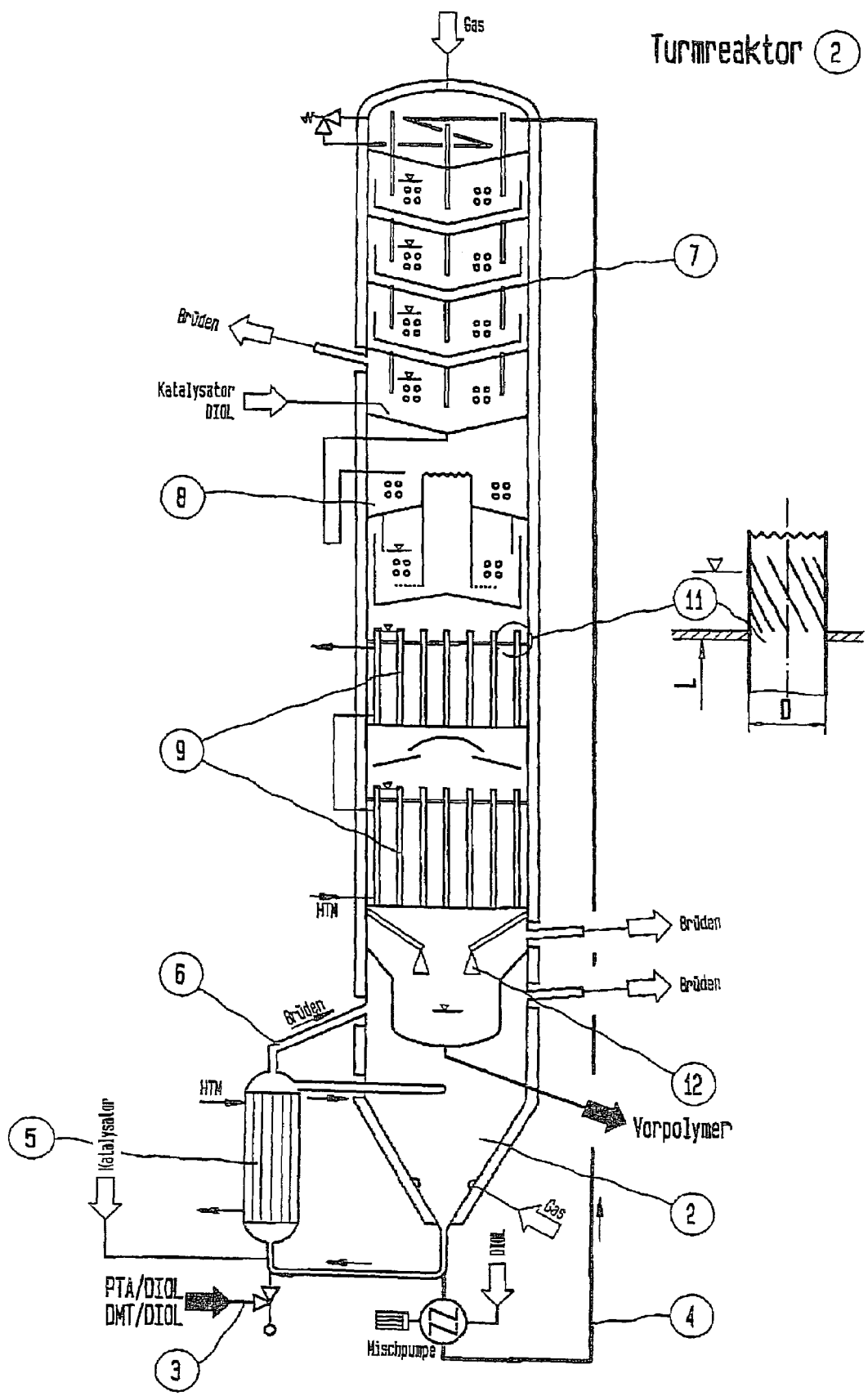

FIG. 2 shows a further variant of the tower reactor (1) which has the essential elements as in FIG. 1.

However, in this variant of the tower reactor, a special mixing pump is used instead of the pressure maintaining valve and the static mixing elements.

Likewise in this variant, the use of an inclined stirrer for mixing additional additives and diols is dispensed.

EXAMPLE 1

1. A paste, which is temperature-controlled to 20–90° C., made of the reactands PTA and diol or the liquid carboxyester and diol with a temperature of 150° C. at of molar ratios between 0.8 and 1.8 are injected into a first chamber, are mixed intensively with the existing monomer/prepolymer reaction fluid in the heat exchanger with product recirculated from the hydrocyclone and at least one catalyst.
2. Degassing by removing the byproducts in an order of magnitude between 30 and 90%, preferably 40 and 60% "in situ" whilst passing through the heat exchanger which directs the reaction vapours into the hydrocyclone via a "chimney" channel (gas/liquid separation).
3. The reaction fluid is further degassed in a connected hydrocyclone at pressures between 500 to 3000 hPa.
4. Injection of a carrier gas at the base of the hydrocyclone for a further improved removal of byproducts. Any inert medium or one of the purified gaseous byproducts (superheated) can be used as carrier gas.
5. Transference of the reaction fluid through a pipe under pressure and simultaneous addition of parts of the diol to the material in quantities between 0.03 to 0.5 mol/mol acid or respectively dimethylester, preferably between 0.1 and 0.3 mol/mol acid or respectively dimethylester in order to achieve an immediate reduction of the carboxyl groups or an exchange of ester end groups between 20–80%, preferably 40–60% of the acid or ester end groups remaining present in the hydrocyclone.
6. Transference of the reaction fluid into a first tray in order to remove the previously formed byproducts and to heat the reaction fluid again by means of the heating jacket of the transfer pipe under pressure inside the tray.
7. The product is directed through at least two or a plurality of vapour-stirred integrated trays with a dwell time of between 5 and 15 min, the temperature increasing constantly in steps of 1 to 20° C. and the pressure being reduced constantly by 5 to 50 hPa per tray. The vapours produced by continuing the reaction are in a non-saturated gaseous state and are introduced below the liquid surface of the following tray, whilst the product flows into the following container in a liquid-impermeable manner. The vapours promote the removal of the reaction side products by intensive mixing with the primary product. In addition, dried inert gas or process gas is admitted into the first tray in order to further improve the reaction progress by saturation of vapour and gas. The obtained reaction progress is between 10 and 40% for the simultaneous reactions between carboxyl and hydroxyl groups as well as ester end groups.
8. The product is transferred into a further flash container in which a pressure which is smaller by $\frac{1}{5}$ to $\frac{1}{50}$ than in the last vapour-stirred container prevails and the reaction temperature is increased by 2 to 20° C. The resultant polyesters have a chain length of 5–20, preferably between 10 and 15 repeat units with a conversion of more than 99.5%.

9. Allowing the polyester to flow in films through at least one high surface-active pipe field in which each partial quantity of product is subjected uniformly to the temperature and surface, from which a prepolymer results which has preferably between 20 and 35 repeat units and a conversion of 99.8%. The superheated reaction gases are directed downwardly in parallel flow with the polymer films and absorb each newly occurring gaseous byproduct of the polymer films. This arrangement enables implementation of the method with the above conditions in a period of time between 5 and 30, preferably 8 and 16 min.

10. In order to equalise the molecular distribution, the product remains further in the system between 2 and 10 min.

11. The polymer is transferred into a polycondensation reactor in which a DP of 80–150 is achieved. A suitable reactor is described for example in U.S. Pat. No. 5,779,986 and in EP 0 719 582.

12. Alternatively, the product pumped out after 2 to 10 min can be processed into a granulate which can be heat treated further then in solid state in order to obtain a polymer with a DP of 90–200.

Both polymers produced according to point 1–11 and also point 1–10 and point 12 are excellently suited to fibre-forming processes, as resin for bottle applications, in particular for "still waters" and for film-forming and industrial plastic material application.

They are distinctive inter alia because of a degree of yellowness improved by up to 2.5 points measured according to CIELAB (b* value) and in a degree of whiteness improved by up to 5 points (L* value).

These analyses indicate inter alia that, compared to polymers produced in previously common methods and equipment, polyesters of high purity are obtained.

The method according to the invention and the device represent therefore, relative to the state of the art, a new concept which is progressive in its features.

The invention claimed is:

1. A method for continuous production of high-molecular weight polyester by esterification of dicarboxylic acids and/or transesterification of dicarboxylic acid esters with diols in the presence of catalysts with formation of a prepolymer and polycondensation thereof into high-molecular weight polyester, wherein a1) a paste and/or a suspension of the dicarboxylic acid and of the diol is produced, there being maintained a molar ratio of diol to dicarboxylic acid of 0.8 to 1.8, a temperature of 20 to 90° C. and a pressure between 0.1 to 1.0 bar, or a2) the dicarboxylic acid ester is melted and the latter is mixed together with the diol in the molar ratio of diol to dicarboxylic acid ester of 1.2 to 1.8 at a temperature of 145 to 165° C.

b1) the products from a1) and/or a2) are supplied continuously to a hydrocyclone zone of a tower reactor where esterification and/or transesterification is implemented in the tower reactor continuously, simultaneously and uninterruptedly until and including pre-polycondensation, the following conditions being maintained: the products from a1) and/or a2) are subjected to a treatment at a temperature of 170 to 270° C. and a pressure of 0.3 to 3 bar, a partial quantity of the catalyst being supplied in this first reaction step and the reaction vapors being removed in situ from the reaction mixture, b2) the product of the reaction step b1) is transferred continuously into a heated pressure pipe and maintained at a pressure of 1 to 10 bar and 200 to 280° C., 0.03 to 0.3 mol diol per mol acid being supplied in this reaction step, b3) the product of the reaction step b2) is transferred continuously into a further zone, in which automatically reducing pressures in the range of 0.2 to 1 bar and automatically increasing temperatures of 230 to 280° C. are maintained, 0.02 to 0.2 mol diol and a partial quantity of the catalyst being supplied into the further zone, b4) the product from reaction step b3) is subjected to a further reaction at 0.01 to 0.1 bar and 240 to 280° C., and b5) the reaction products water or respectively methanol, byproducts and excess diol from the reaction steps b1) and b3) to b5) are removed and the diol is directed back again after purification to the individual reaction steps, c1) the prepolymer obtained from b4) is continuously polycondensed in a normal polycondensation apparatus at temperatures of 240 to 290° C. and pressures of 0.0002 to 0.003 bar or c2) the obtained prepolymer is solidified, processed into pellets and subjected to a subsequent condensation in solid phase at temperatures between 160 and 230° C. under conditioned inert gas.

2. The method according to claim 1 wherein the gaseous byproducts produced in reaction step b1) and excess diol are separated by means of a hydrocyclone in statu nascendi.

3. The method according to claim 2 wherein, in addition to assisting the separation, an inert gas and/or a superheated process gas is directed through the base.

4. The method according to claim 1 wherein, in reaction step b1), a temperature of 170 to 200° C. and a pressure between 0.3 to 1 bar is maintained during the transesterification.

5. The method according to claim 1 wherein, in reaction step b1), a temperature of 200 to 270° C. and a pressure between 0.3 to 3 bar is maintained during the esterification.

6. The method according to claim 1 wherein, during the transesterification, the pressure in reaction step b2) is in the range of 2 to 5 bar, the dwell time between 1 and 5 mm and the temperature in the range of 200 to 240° C.

7. The method according to claim 1 wherein, during the esterification, the pressure in reaction step b2) is in the range of 2 to 6 bar, the dwell time between 1 and 4 min and the temperature in the range of 220 to 280° C.

8. The method according to claim 1 wherein, during the transesterification in reaction step b3), a temperature of 220 to 260° C. is maintained.

9. The method according to claim 1 wherein, during the esterification in reaction step b3), a temperature of 230 to 280° C. is maintained.

10. The method according to claim 1 wherein, in reaction step b3), the reaction product supplied continuously from reaction step b2) is directed over a downflow tray-cascade, pressure falling by 20 to 60 mbar and temperature increasing by 5 to 20° C. being set per tray, as a result of which a precondensate with 5 to 20 repeat units and a conversion of 98.5 to 99.5% during transesterification or respectively a conversion of 97 to 99.5% during esterification is produced.

11. The method according to claim 10 wherein, in addition to the formed process gas, an inert gas and/or a further superheated process gas for assisting the separation of the byproducts is directed into at least the first tray below the reaction material surface.

12. The method according to claim 10 wherein the dwell time in the individual trays is in the region of 5–15 min.

13. The method according to claim 10 wherein the product supply into the trays is effected centrally and the product of the tray discharges uniformly distributed over the outer wall for accelerated degassing and thereafter is directed together again centrally.

14. The method according to claim 1 wherein, in reaction step b4), which is configured as a falling-film reaction zone, the reaction is continued at 245 to 270° C. and 0.01 to 0.05 bar with a dwell time of 4 to 30 min, a precondensate being produced with 10–40 repeat units and a conversion of 99.8%.

15. The method according to claim 1 wherein the reaction product, after leaving the one or more falling-film zones b4), is directed together through a heated cone and a gas-liquid separation is undertaken in its central region by means of spoilers.

16. The method according to claim 1 wherein 1,4-butanediol is used as diol.

17. The method according to claim 1 wherein terephthalic acid is used as dicarboxylic acid.

18. The method according to claim 1 wherein dimethyl terephthalate (DMT) is used as dicarboxy acid ester.

19. The method according to claim 1 wherein antimony, germanium, tin and/or titanium metal or organic compounds therefrom, also in a porous carrier substance, are used as catalysts.

20. The method according to claim 2 wherein, in reaction step b1), a temperature of 170 to 200° C. and a pressure between 0.3 to 1 bar is maintained during the transestenfication.

21. The method according to claim 3 wherein, in reaction step b1), a temperature of 170 to 200° C. and a pressure between 0.3 to 1 bar is maintained during the transesterification.

22. The method according to claim 2 wherein, in reaction step b1), a temperature of 200 to 270° C. and a pressure between 0.3 to 3 bar is maintained during the esterification.

23. The method according to claim 3 wherein, in reaction step b1), a temperature of 200 to 270° C. and a pressure between 0.3 to 3 bar is maintained during the esterification.

24. The method according to claim 4 wherein, in reaction step b1), a temperature of 200 to 270° C. and a pressure between 0.3 to 3 bar is maintained during the estenfication.

25. The method according to claim 20 wherein, in reaction step b1), a temperature of 200 to 270° C. and a pressure between 0.3 to 3 bar is maintained during the esterification.

26. The method according to claim 21 wherein, in reaction step b1), a temperature of 200 to 270° C. and a pressure between 0.3 to 3 bar is maintained during the esterification.

27. The method according to claim 2 wherein, during the transesterification, the pressure in reaction step b2) is in the range of 2 to 5 bar, the dwell time between 1 and 5 min and the temperature in the range of 200 to 240° C.

28. The method according to claim 3 wherein, during the transesterification, the pressure in reaction step b2) is in the range of 2 to 5 bar, the dwell time between 1 and 5 min and the temperature in the range of 200 to 240° C.

29. The method according to claim 4 wherein, during the transesterification, the pressure in reaction step b2) is in the range of 2 to 5 bar, the dwell time between 1 and 5 min and the temperature in the range of 200 to 240° C.

30. The method according to claim 5 wherein, during the transesterification, the pressure in reaction step b2) is in the range of 2 to 5 bar, the dwell time between 1 and 5 min and the temperature in the range of 200 to 240° C.

31. The method according to claim 20 wherein, during the transesterification, the pressure in reaction step b2) is in the range of 2 to 5 bar, the dwell time between 1 and 5 min and the temperature in the range of 200 to 240° C.

32. The method according to claim 21 wherein, during the transesterification, the pressure in reaction step b2) is in the range of 2 to 5 bar, the dwell time between 1 and 5 min and the temperature in the range of 200 to 240° C.

33. The method according to claim 22 wherein, during the transesterification, the pressure in reaction step b2) is in the range of 2 to 5 bar, the dwell time between 1 and 5 min and the temperature in the range of 200 to 240° C.

34. The method according to claim 23 wherein, during the transesterification, the pressure in reaction step b2) is in the range of 2 to 5 bar, the dwell time between 1 and 5 min and the temperature in the range of 200 to 240° C.

35. The method according to claim 24 wherein, during the transesterification, the pressure in reaction step b2) is in the range of 2 to 5 bar, the dwell time between 1 and 5 min and the temperature in the range of 200 to 240° C.

36. The method according to claim 25 wherein, during the transesterification, the pressure in reaction step b2) is in the range of 2 to 5 bar, the dwell time between 1 and 5 min and the temperature in the range of 200 to 240° C.

37. The method according to claim 26 wherein, during the transesterification, the pressure in reaction step b2) is in the range of 2 to 5 bar, the dwell time between 1 and 5 min and the temperature in the range of 200 to 240° C.

* * * * *

UNITED STATES PATENT AND TRADEMARK OFFICE
CERTIFICATE OF CORRECTION

| | |
|---|---|
| PATENT NO. | : 7,115,701 B2 |
| APPLICATION NO. | : 10/495197 |
| DATED | : October 3, 2006 |
| INVENTOR(S) | : Eike Schulz van Endert et al. |

It is certified that error appears in the above-identified patent and that said Letters Patent is hereby corrected as shown below:

Title Page #75 change "Eike Schultz Van Endert" to --Eike Schultz van Endert--.

Signed and Sealed this

Second Day of January, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,115,701 B2 | Page 1 of 1 |
| APPLICATION NO. | : 10/495197 | |
| DATED | : October 3, 2006 | |
| INVENTOR(S) | : Eike Schulz van Endert et al. | |

It is certified that error appears in the above-identified patent and that said Letters Patent is hereby corrected as shown below:

Item (12) change "Schultz Van Endert et al." to --Schulz van Endert--.

Title Page #75 change "Eike Schultz Van Endert" to --Eike Schulz van Endert--.

This certificate supersedes Certificate of Correction issued January 2, 2007.

Signed and Sealed this

Second Day of October, 2007

JON W. DUDAS
*Director of the United States Patent and Trademark Office*